March 4, 1952     H. W. KOST     2,588,251
FASTENER FOR APERTURED PANELS
Filed Nov. 17, 1949
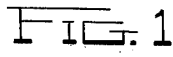
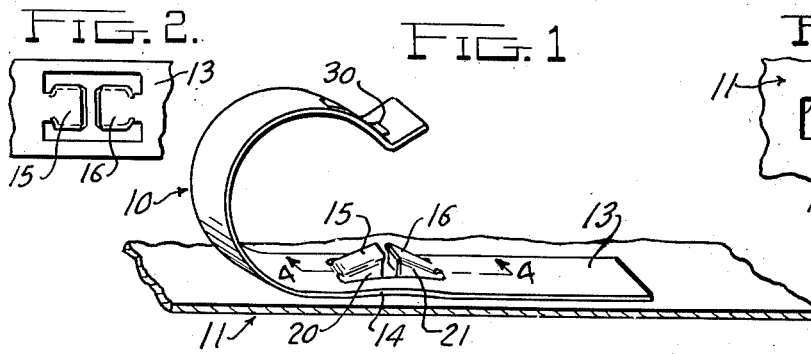
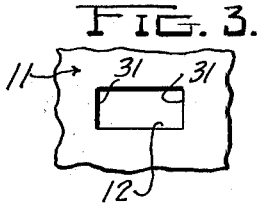
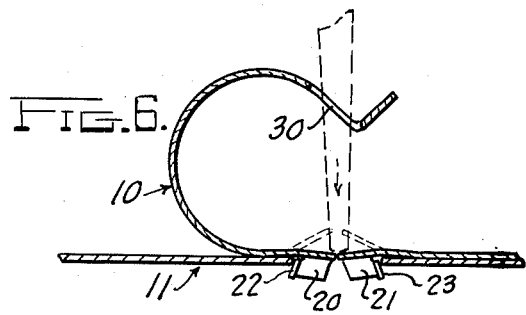
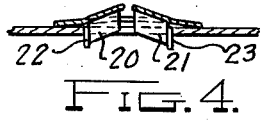
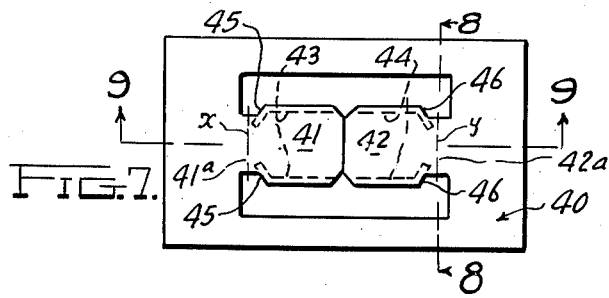
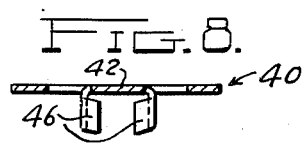
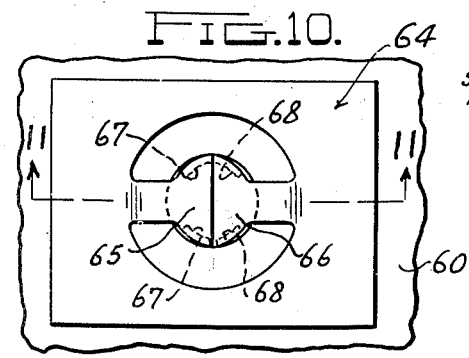
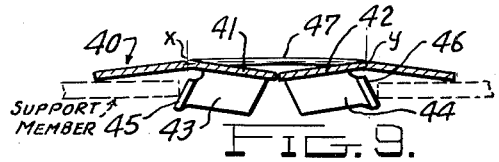
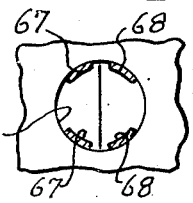
INVENTOR.
Harold W. Kost
BY
ATTORNEY Patented Mar. 4, 1952

2,588,251

UNITED STATES PATENT OFFICE 2,588,251

FASTENER FOR APERTURED PANELS

Harold W. Kost, Toledo, Ohio, assignor to Prestole Corporation, Toledo, Ohio, a corporation of Michigan Application November 17, 1949, Serial No. 127,855

4 Claims. (Cl. 85—37)

This invention relates generally to attaching elements made of sheet metal by stamping operations, and which may be readily applied to the supporting structure by means of a blunt ended tool.

One object of the invention is to produce an improved attaching element, which will be positively locked after its application and will not depend merely upon the flexural resistance of the metal to resist dislocation of the attached parts.

Another object is to produce an improved attaching element which after its application, will present a relatively flat and substantially closed top surface.

A further object is to produce an improved attaching element which compensates for slight inaccuracies in the holes through the supporting means to which it is applied.

Other objects of the invention reside in details of construction, operation and assembly and for purposes of illustration but not of limitation, embodiments of the invention are shown in the accompanying drawings, in which Figure 1 is an enlarged perspective view of a cable clip embodying one form of the improved attaching element, the element being shown in the position before attachment to the supporting means;

Figure 2 is a top view of the attaching element of Figure 1;

Figure 3 is a plan view of the supporting means showing one form of the aperture therein for receiving the clamping elements of the attaching means;

Figure 4 is a section taken substantially on the line 4—4 of Figure 1;

Figure 5 is a bottom view of the attaching element of Figure 1, showing it in position before clamping to the supporting panel;

Figure 6 is a vertical section through the cable clip shown in Figure 1, the attaching means being shown in locked position;

Figure 7 is an enlarged plan view of an integral clip embodying the attaching means of the invention, the clip being shown in locked position;

Figure 8 is a section taken substantially along the line 8—8 of Figure 7;

Figure 9 is a section taken substantially along the line 9—9 of Figure 7;

Figure 10 is an enlarged plan view of a clip embodying an alternate form of the invention, the clip being adapted to lock in a round hole;

Figure 11 is a section taken substantially along the line 11—11 of Figure 10; and Figure 12 is a section taken substantially along the line 12—12 of Figure 11.

Referring to the drawings, and particularly to Figures 1 to 6 inclusive, a cable clip indicated generally at 10, is mounted on a sheet metal supporting panel 11. The panel 11 which is of relatively thin metal may be part of an automotive body or other structure, and has formed therein a rectangular opening 12 for receiving the attaching element.

The lower part 13 of the cable clip 10 has formed therein an upwardly bowed section 14, and in this section, a pair of oppositely arranged tongues 15 and 16 are formed by stamping and bent upwardly as shown in Figure 1. The tongues 15 and 16 have formed thereon pairs of parallel depending flanges 20 and 21 respectively, the outer ends of these flanges being bent inwardly toward each other, as shown at 22 and 23. It will be noted in Figure 4 that the flange ends 22 and 23 are also parallel in the unlocked position of the attaching element. This permits the insertion of the element in the rectangular aperture 12 of the supporting panel 11.

To compensate for slight irregularity of size of the aperture 12, the flange ends 22 and 23 are bent relative to the flanges so that they may be compressed if the aperture is undersized and can expand if the aperture is oversized.

After the flanges have been inserted in the aperture, the clip is locked in position. This is accomplished as shown in Figure 6 by inserting a blunt instrument through an opening 30 provided in the clip 10, and pressing downwardly on the tongues 15 and 16, forcing them into locking position with the flange ends 22 and 23 in angular contact with the end surfaces or walls 31 of the aperture 12. In moving the tongues into locked position, they are forced past the toggle center and can not accidently be dislodged, as will hereinafter be described.

To remove the clip 10 from the supporting panel 11, a pointed instrument may be inserted under the tongues 15 and 16 which are pried up past the toggle center whereupon they assume the position shown in Figure 1.

In the form of the invention shown in Figures 7, 8 and 9, a flat clip 40 is provided with opposed tongue elements 41 and 42, the tongue elements having oppositely depending flanges 43 and 44. The flanges 43 and 44 have inturned ends 45 and 46 which are similar to those shown in Figure 1. The clip is shown in Figure 7 in its attached position and in Figure 9, the toggle locking action is readily apparent. The clip shown in Figure 7 can be used for holding metal parts together, or it can be formed with the ends upwardly bent to receive a metal molding or other desired part.

Referring to Figure 9, the tongues 41 and 42 are bent about their narrowed portions 41a and 42a, such lines of bend being indicated approximately as "x" and "y" in Figure 9. As the length of the tongues 41 and 42 is slightly greater than the distance between lines x and y, a slight flattening of the upwardly bowed portion 47 of the clip 40 takes place to allow the ends of the tongues 41 and 42 to pass the toggle center. When the bowed portion of the clip springs back into position, the tongues 41 and 42 are held in locked position and can not be accidentally dislodged from the supporting panel shown by the dotted lines.

In Figure 8 it will be noted that the flange ends 46 are inclined downwardly as well as inwardly. This is for the purpose of easily entering the attaching elements into the aperture in the supporting panel.

In the alternate form of the invention shown in Figures 10, 11 and 12, the supporting panels 60 and 61 are provided with round openings as indicated at 62. The clip 64 is provided with a pair of opposed tongues 65 and 66, which are formed with pairs of arcuate depending flanges 67 and 68 respectively, adapted to contact the interior periphery of the openings 62 in the supporting panels. Since the toggle locking action of the clip 64 is the same as that of the clip 40, further description is deemed unnecessary.

The cambered or arched form of the base or body of the fastener is of importance since it makes possible the toggle action which effectively holds the tongues in their locked or fastener-retaining position. It will be clear that since the tongues are straight and although they are struck from the cambered body or base of the fastener, the distance between the integral hinge-like connections of the tongues with the body is shorter than the curvilinear distance between these points created by the arching effect. Thus when the tongues are pushed downwardly from their outwardly inclined normal position to their locking position past the toggle center, the secure holding effect is achieved, retrograde movement of the tongues being accomplished only with difficulty.

From the above description, it will be manifest that I have produced an exceedingly simple fastener from sheet metal such, for example, as cold rolled steel which can be applied to an apertured supporting panel readily and without the use of any particular tool, for example the handle end of a screw driver being usable for forcing the tongues into secure holding engagement. One important advantage resides in the substantial sealing of the aperture in the supporting panel because after the locking tongues have been moved into locking position, the aperture is substantially covered, thus effectively preventing foreign matter from passing therethrough. The places in which this fastening device can be used are numerous as well as the forms that it can assume. The ease of mounting and the tightness with which it holds itself in position lends itself admirably for use as a cable clip as above described, as well as a molding fastener such as are used on automobiles, refrigerators and the like.

What I claim is:

1. A fastener comprising a sheet metal body for application to one side of an apertured panel, a pair of tongues integral at one end with said body and having their free ends adjacent each other and normally disposed in outwardly inclined position, and a blocking projection integral with the attached end portion of each tongue for overlapping engagement with an inside edge portion of a panel aperture when the tongues are swung inwardly from normal position, the free ends of said tongues engaging each other in such inward swinging movement in toggle-like action.

2. A fastener comprising an outwardly cambered sheet metal body for application to one side of an apertured panel, a pair of tongues integral at one end with said body and having their free ends adjacent each other and normally disposed in outwardly inclined position, and a blocking flange projection integral with an end portion of each tongue for overlapping engagement with an inside edge portion of a panel aperture when the tongues are swung inwardly from normal position, the free ends of said tongues engaging each other in such inward swinging movement in toggle-like action.

3. A fastener comprising a sheet metal body for application to one side of a panel having a rectangular aperture, a pair of tongues integral with said body with the free ends normally inclined outwardly from the body and engageable with each other in toggle-like manner, and a pair of blocking flanges integral with the attached end portion of each tongue extending toward each other and in an inclined direction away from the free end of the respective tongue for abutting engagement with an adjacent edge portion of the panel aperture when the tongues are flexed from their normal position to a toggled position.

4. A fastener comprising a sheet metal body for application to one side of a panel having a round aperture, a pair of tongues integral with and struck from said body with the free ends normally inclined outwardly from the body and engageable with each other in toggle-like manner, the free end portions of said tongues being generally semi-circular in shape to conform to the shape of the panel aperture, and a pair of blocking flanges integral with the side portions respectively of each tongue extending toward each other and in an inclined direction away from the free end of the respective tongue for abutting engagement with an adjacent edge portion of the panel aperture when the tongues are flexed from their normal position to a toggled position.

HAROLD W. KOST.

REFERENCES CITED

The following references are of record in the file of this patent:

UNITED STATES PATENTS

| Number | Name | Date |
| --- | --- | --- |
| 1,988,345 | Vaughn | Jan. 15, 1935 |
| 2,058,338 | Meissner | Oct. 20, 1936 |
| 2,173,198 | Churchill | Sept. 19, 1938 |
| 2,319,678 | Hall | May 18, 1943 |
| 2,353,583 | Place | July 11, 1944 |
| 2,391,140 | Dilley | Dec. 18, 1945 |
| 2,404,372 | Hallock | July 23, 1946 |